(12) United States Patent
Worden

(10) Patent No.: US 8,348,324 B2  
(45) Date of Patent: Jan. 8, 2013

(54) VEHICLE CARGO SPACE LINER

(76) Inventor: Peter Worden, Chatham, NJ (US)

(*) Notice: Subject to any disclaimer, the term of this patent is extended or adjusted under 35 U.S.C. 154(b) by 48 days.

(21) Appl. No.: 13/042,923

(22) Filed: Mar. 8, 2011

(65) Prior Publication Data

US 2012/0228894 A1    Sep. 13, 2012

(51) Int. Cl.
*B60R 13/00* (2006.01)
(52) U.S. Cl. .................................................... 296/39.1
(58) Field of Classification Search .............. 296/39.1, 296/39.2
See application file for complete search history.

(56) References Cited

U.S. PATENT DOCUMENTS

| | | | |
|---|---|---|---|
| 4,279,439 A | 7/1981 | Cantieri |
| 4,765,671 A | 8/1988 | Allen |
| 4,789,574 A | 12/1988 | Selvey |
| 4,877,281 A | 10/1989 | Altmann |
| 4,893,862 A | 1/1990 | Hollenbaugh, Sr. |
| 5,110,171 A | 5/1992 | Anthony |
| 5,139,300 A | 8/1992 | Carriere |
| 5,378,034 A | 1/1995 | Nelsen |
| 5,419,602 A | 5/1995 | VanHoose |
| 5,683,132 A | 11/1997 | Danzo |
| 5,722,710 A | 3/1998 | Falciani |
| 5,806,909 A | 9/1998 | Wise |
| 6,017,074 A | 1/2000 | Biskup |
| 6,120,078 A | 9/2000 | Smyl |
| 6,131,983 A | 10/2000 | Jackson |
| 6,203,089 B1 | 3/2001 | Doolittle, III |
| 6,206,443 B1 | 3/2001 | Konop |
| 6,290,278 B1 | 9/2001 | Loveland |
| 6,595,568 B1 | 7/2003 | Schroeder |
| 6,827,231 B2 | 12/2004 | Budowski |
| 6,845,875 B2 | 1/2005 | Grattan |
| 7,059,647 B1 | 6/2006 | Sierakowski |
| 7,178,851 B1 | 2/2007 | Gridley |
| 7,219,944 B2 | 5/2007 | Klotz |
| 7,597,373 B2 | 10/2009 | McAuliffe, Jr. |
| 2005/0218682 A1 | 10/2005 | Klotz |
| 2008/0303303 A1 | 12/2008 | Valentine |
| 2009/0033121 A1 | 2/2009 | McGorman |

FOREIGN PATENT DOCUMENTS

WO    WO 95/04671    2/1995

*Primary Examiner* — Joseph Pape  
(74) *Attorney, Agent, or Firm* — Gearhart Law, LLC

(57) ABSTRACT

A removable, drapable liner intended for protecting a cargo space of a vehicle. The liner has a base and four sides, all being made of a flexible, tear resistant, water resistant fabric, and is transformable between a stored state, in which it may fold flat or be rolled up, and a drapable, open-topped, box-shaped state. The liner is neither rigid nor self standing, but does have supportive draping strips that provide sufficient support to easily conform the liner to the shape of the cargo space, effectively draping it against the sides and base of the cargo container. The four supportive draping strips each form part of a join between two sides of the liner. The draping strips extending along the length of the joins. Draped against the cargo space, the liner is easy to fill and maximizes the use of the cargo space, while protecting the vehicle.

3 Claims, 3 Drawing Sheets

VEHICLE CARGO SPACE LINER

CLAIM OF PRIORITY

This application is a US non-provisional, utility application that claims, without relinquishing future claims, no currently known priority to any previous US patent application or other equivalent documentation.

FIELD OF THE INVENTION

The invention relates to liners for storage compartments, and in particular motor vehicle cargo spaces, such as the rear compartment of a sport utility vehicle (SUV), for example.

BACKGROUND OF THE INVENTION

Owners of sport utility vehicles (SUV) frequently use them for hauling trash and yard trimmings to disposal stations. The cargo carrying compartments of most modern day SUV's are finished with fabric or composition materials. Unless the compartment is lined, these materials can become easily cut (e.g. by rose bush thorns or barbs) or scarred. A lining is also desirable for keeping the cargo compartment clean. Small leaves, bush berries, twigs, etc. become dislodged and fall into, and become difficult to remove from, crevices and below the seats.

Usually the owner attempts to use a piece of canvas, a plastic tarp, a blanket, or the like, as a liner for the storage compartment. A disadvantage of this arrangement is that the tarp or blanket must be propped up on the sides and also at both the front and rear of the compartment. Otherwise, there is no cover for the upright boundaries of the compartment which are usually made of less durable materials than the floor and need protection the most. Also, even if the liner is initially successfully propped, the props are easily knocked down by the trash or other cargo as it is inserted into the compartment.

DESCRIPTION OF THE RELATED ART

The relevant prior art involving cargo liners includes:

U.S. Pat. No. 3,653,710 issued to Barnard on Apr. 4, 1972 entitled "STORAGE COMPARTMENT LINER WITH INFLATABLE SUPPORT RIBS" that describes a liner of sheet fabric construction. It includes a bottom that is approximately the same size as the compartment floor. A side wall is provided on at least the sides and forward end. At least some of the walls include inflatable ribs for giving the side walls standup rigidity.

U.S. Pat. No. 4,516,906 issued to Krein on May 14, 1985 entitled "Free standing, waterproof lining for truck industry" that describes a method of installing a continuous moisture proof essentially disposable film liner within a conventional cargo trailer to protect moisture sensitive cargo during shipment. A polyolefin bag is inflated directly into an empty tractor trailer by attaching the lower edge of the bag opening along the bottom of the doorway of the trailer and blowing a gentle stream of air into the bag as sufficient tension is applied to the upper edge and surface of the bag to direct the air to the rear of the trailer. In this manner, the bag inflates from the rear of the trailer forward, thus pushing the air trapped between the bag and the inside of the trailer out the open doorway without the bag exiting the trailer. Once the bag is properly inflated and in contact with the inside of the trailer, it has been found that it tends to remain in place for sufficient time to load the cargo, even without continued use of the blower.

U.S. Pat. No. 5,683,132 issued to Danzo, et al. pm Nov. 4, 1997 entitled "Sport utility vehicle cargo area liner" that describes a sport utility vehicle cargo area liner is provided which is made of a flexible semi-rigid material such as ABS plastic. The liner has a bottom, two side walls each of which have at their uppermost edges near the wheel well a ledge which fits over the wheel well, and a leading edge and trailing edge. The leading and trailing edges are curved upwardly to allow the liner to easily slide over the sill of the sport utility vehicle cargo area and also to allow objects longer than the liner itself to be placed into the cargo area without the necessity of removing the liner or interfering with the vehicle seats. A stop strap system with a quick disconnect feature is provided to keep the liner safely in place yet it allows the quick removal of the liner. A harness is also provided to secure items in the liner.

U.S. Pat. No. 7,597,373 issued to McAuliffe, Jr. on Oct. 6, 2009 entitled "Flexible adjustable cargo area liner for station wagons, minivans and sport utility vehicles" that describes a flexible adjustable liner for station wagons, minivans and SUVs comprising a water-resistant material with sealed bottom, front and side sections to prevent spillage or leakage into the storage area, and a rear section that opens and closes with the tailgate or hatch door, thereby allowing cargo items to be easily placed onto or removed from the liner. The liner is suspended by an adjustable tether-support system. The adjustable support system comprises a system of cords that are attached along the ceiling or upper windows of the vehicle via a series of suction cups and/or the original equipment clothes hooks, conforming the liner to the entire storage area. The cords are adjustable in length and are set by spring-detent cinches to vary the coverage of the liner across the cargo area.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a removable, drapable liner for a cargo space of a vehicle.

In a preferred embodiment, the removable, drapable liner may have a base and four sides that may all be made of a flexible, tear resistant, water resistant fabric. The removable, drapable liner is preferably transformable between a stored state, in which it may fold flat or be rolled up, and a drapable, open-topped, box-shaped state when it may be used to provide protection for a cargo space of a vehicle.

Although box shaped, the liner may not be rigid or self standing. In a preferred embodiment, the removable, drapable liner may have up to four supportive draping strips, each forming a part of, and extending along substantially the entire length of, a join between two sides of the liner. These supportive draping strips may provide sufficient support to easily conform the liner to the shape of the cargo space, effectively drapping it against the sides and base of the cargo container. In such a configuration the liner is both easy to fill and maximizes the use of the cargo space, while protecting the vehicle.

Therefore, the present invention succeeds in conferring the following, and others not mentioned, desirable and useful benefits and objectives.

It is an object of the present invention to provide a cargo space liner that is easy to use and easy to clean.

It is another object of the present invention to provide a liner for transporting recyclable materials that is itself made of recyclable material.

Yet another object of the present invention is to provide a cargo liner that may be printed on or painted for branding or advertising purposes.

Yet another object of the present invention is to provide a cargo liner having a simple, easy to fabricate design that minimizes both material and manufacturing costs.

Still another object of the present invention is to provide a cargo liner that may be easily and quickly removed from the cargo space.

Still another object of the present invention is to that, after removal, may be easily and quickly cleaned by turning upside down and shaking, sweeping or washing.

Yet another object of the present invention is to provide a cargo liner that is easily and quickly stored when not in use.

Still another object of the present invention is to provide a cargo liner that may be turned upside down and easily and quickly used to cover equipment, materials and or other articles, either indoors or outdoors.

DESCRIPTION OF THE PREFERRED EMBODIMENTS

Figure 1:
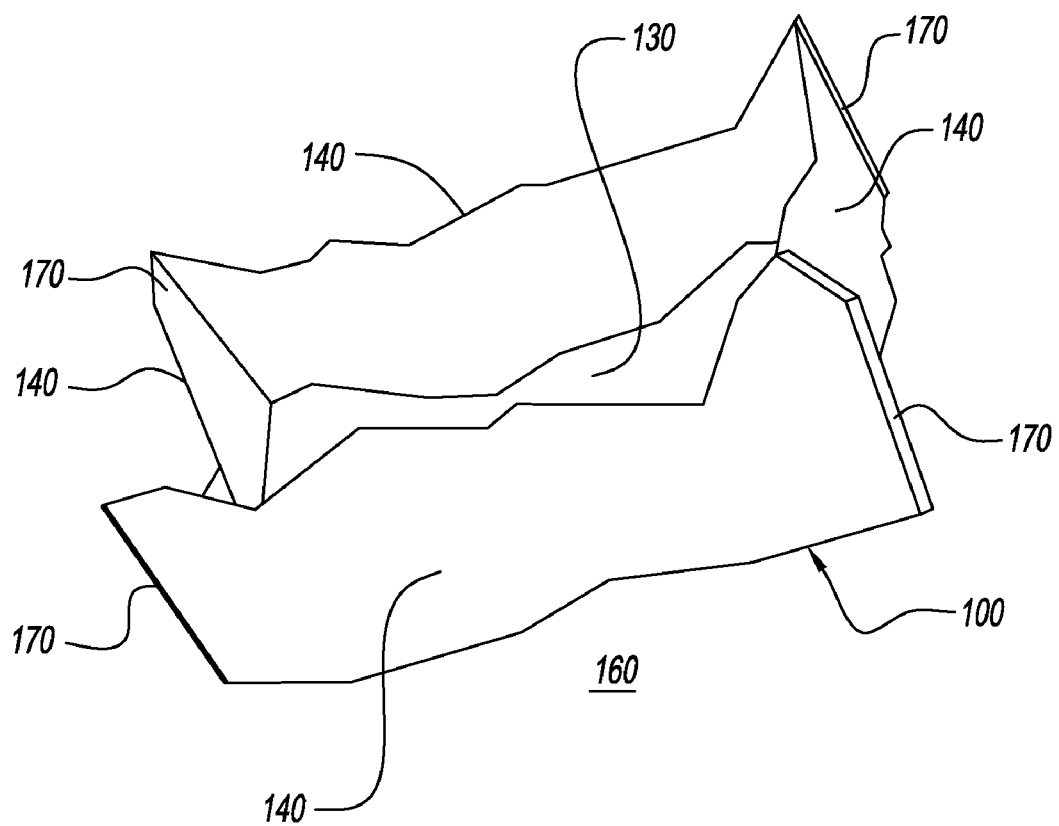
FIG. 1 shows an isometric view of a preferred embodiment of present invention.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows an isometric view of a preferred embodiment of a removable, drapable liner 100 of the present invention.

In a preferred embodiment, the removable, drapable liner 100 may have a base 130 and four sides 140. The base 130 and the four sides 140 may all be made of a suitable material that may be a flexible, tear resistant, water resistant fabric.

In FIG. 1, the removable, drapable liner 100 is shown in a drapable, open-topped, box-shaped state 160. This drapable, open-topped, box-shaped state 160 may be facilitated by, for instance, by one or more supportive draping strips 170. Each of the supportive draping strips 170 may form a part of, and extend along substantially the entire length of, a join between two sides of the liner. The supportive draping strips 170 may be configured such that when the removable liner is in the drapable, open-topped, box-shaped state, the supportive draping strips 170 protrude outwards, and away from, the liner.

The supportive draping strips 170 may, however, allow the removable, drapable liner 100 to be quickly and easily transformed into a flat, rolled or folded, storable state 220 (not shown in FIG. 1).

The flexible, tear resistant, water resistant fabric that the removable, drapable liner 100 may be made of may, for instance, be a suitable woven or nonwoven fabric such as, but not limited to, a polyethylene, a polypropylene fabric, a suitably coated canvas, a tarpaulin fabric, a cotton fabric, a bamboo fabric or some combination thereof.

In a preferred embodiment, the removable, drapable liner 100 may be made from a flexible, tear resistant, water resistant fabric 150 that may be fully or partially recyclable.

Figure 2:
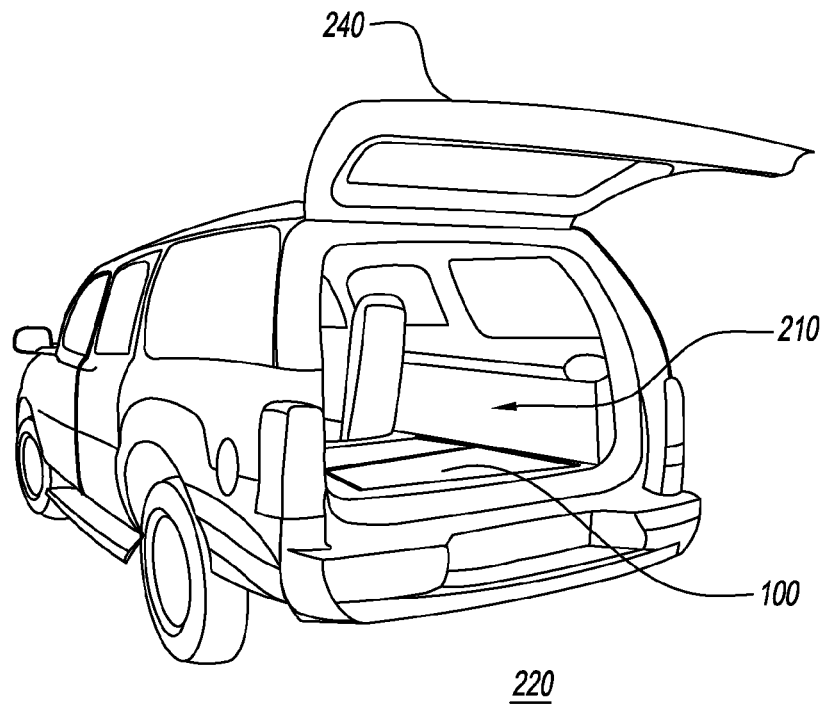
FIG. 2 shows an isometric view of a preferred embodiment of the present invention in a flat, rolled or folded, stored state within a cargo space of a vehicle.

FIG. 2 shows an isometric view of a preferred embodiment of the removable, drapable liner 100 in a flat, rolled or folded, stored state 220 within a cargo space 110 of a vehicle.

Figure 3:
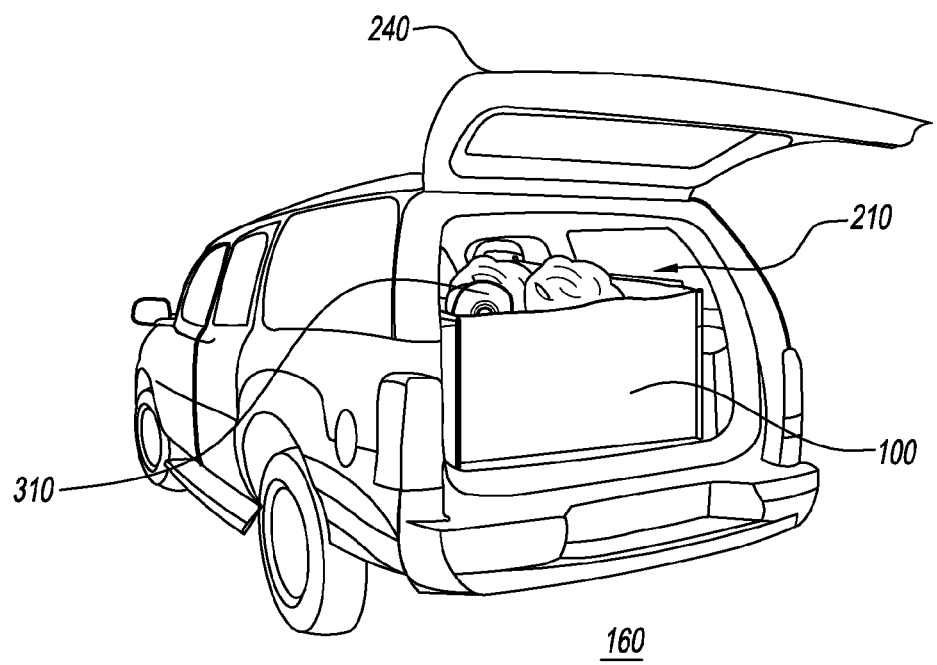
FIG. 3 shows an isometric view of a preferred embodiment of the present invention in a drapable, open-topped, box-shaped state and containing objects to be transported.

FIG. 3 shows an isometric view of a preferred embodiment of the removable, drapable liner 100 the present invention in a drapable, open-topped, box-shaped state 160 within a cargo space of a vehicle 210. The removable, drapable liner 100 may contain objects to be transported 310. A function of the removable, drapable liner 100 may, for instance, be to protect the cargo space of a vehicle 110 from damage or despoilment by the objects to be transported 310.

The removable, drapable liner 100 shown in FIG. 3 is sized to be substantially equal in depth to the cargo space of a vehicle 210. In alternate embodiments, the removable, drapable liner 100 may only be approximately equal in size to the cargo space of a vehicle 210. Such an undersized or oversized removable, drapable liner 100 may rely on its drapability to conform to the dimensions of the cargo space of a vehicle 210, especially as materials are added to the removable, drapable liner 100.

The removable, drapable liner 100 may, for instance, be sized, when in said drapable, open-topped box-shaped state, to extend outward from a rear end of the cargo space 230. The removable, drapable liner 100 may, for instance, be sized to extend outward from the rear end of the cargo space 230 by a distance in a range of 1 foot to 6 feet, though more preferably in a range of 1.5 feet to 2.5 feet.

When the removable, drapable liner 100 extends outwards from the rear end of the cargo space 230, the removable, drapable liner 100 may form a substantially 3 sided liner within the cargo space of the vehicle 210. The fourth side 140 may drape down toward the ground, allowing easy assess for placing objects such as, but not limited to, the objects to be transported 310, into the removable, drapable liner 100. Once the removable, drapable liner 100 is loaded, the fourth side 140 may then be draped over the top of the loaded objects, forming both a fourth side and a top, or partial top, to the load.

To unload the objects to be transported 310, the procedure may be reversed. After opening the rear door of the vehicle 240, the side 140 of the removable, drapable liner 100 forming the rear side and top may be unfolded and allowed to drape down toward, and if necessary, onto the ground. The removable, drapable liner 100 may then effectively be a three sided container, supported against the walls of the cargo space of the vehicle 210. Such an arrangement may allow easy access for unloading the objects on the removable, drapable liner 100.

Figure 4:
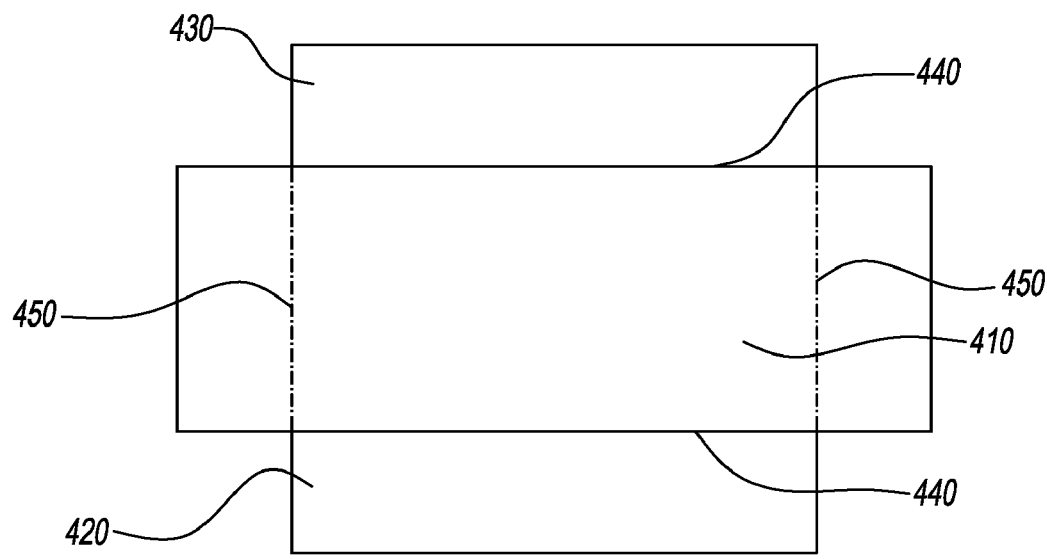
FIG. 4 shows a plan view of materials sized to form an embodiment of a removable, drapable liner.

FIG. 4 shows a plan view of materials sized to form an embodiment of a removable, drapable liner 100.

The removable, drapable liner 100 may, for instance, be made from three pieces of fabric, a main piece of fabric 410, a left side piece of fabric 420 and a right side piece of fabric 430. The main piece of fabric 410 may be used to form the base 130 and the front and back sides 140. The left side piece of fabric 420 and the right side piece of fabric 430 may be substantially equal in size and may, for instance, be used to form the left and right sides 140 of the removable, drapable liner 100.

In a preferred embodiment, the main piece of fabric 410 may have a length that is substantially equal to the length of the left side piece of fabric 420 or the right side piece of fabric 430 plus twice the width of the left side piece of fabric 420 or the right side piece of fabric 430. That is, the main piece of fabric 410 may have a length substantially equal to the base of the removable, drapable liner 100 plus the height of two sides of the removable, drapable liner 100.

The removable, drapable liner 100 may then be formed by, for instance, joining the left side piece of fabric 420 to the main piece of fabric 410 along a first join line 440, and the right side piece of fabric 430 to the main piece of fabric 410 along a second join line 440. This joining may be accomplished by any suitable means such as, but not limited to, stitching, stapling, gluing, welding, sewing or some combination thereof.

A front portion of the main piece of fabric 410 may then be folded up along a first fold line 450 while the left side piece of fabric 420 and the right side piece of fabric 430 are folded up along their respective join lines 440. A narrow edge of the left side piece of fabric 420 may then be joined to the main piece of fabric 410 to form a first side edge, while a narrow edge of the right side piece of fabric 430 may be joined to the main piece of fabric 410 to form a second side edge. Although this joining may be accomplished by any suitable means such as, but not limited to, stitching, stapling, gluing, welding, sewing or some combination thereof, in a preferred embodiment, the joining may be done by double stitching in accordance with the method described below so that the side edges may form supportive draping strips 170.

This procedure may be repeated using a rear portion of the main piece of fabric 410 folded up along a second fold line 450. In this way the rear side 140 of the removable, drapable liner 100 may be formed, along with two further supportive draping strips 170.

Advantages of this method of construction include, but are not limited to, the ability to make the width of the base 130 of the removable, drapable liner 100 equal to the widest available rolls of the fabric being used. This may not only reduce material costs, but may also reduce material waste. Such a design may, for instance, also reduce labor costs by reducing the amount of stitching required to construct a removable, drapable liner 100.

Figure 5:
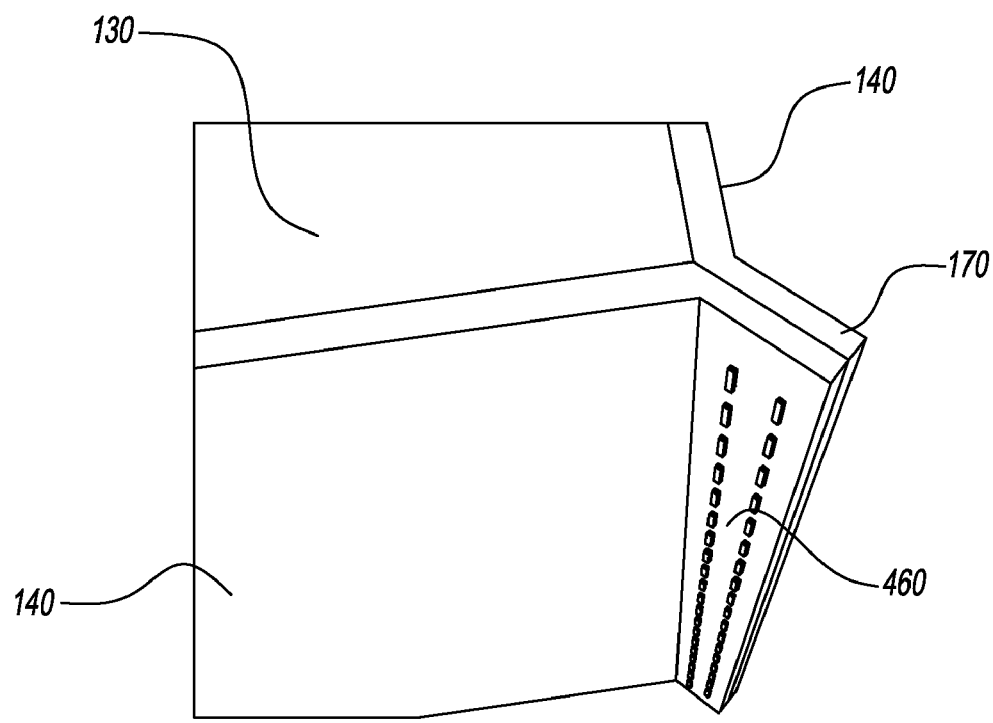
FIG. 5 shows an isometric view of a supportive draping strip of a preferred embodiment of the present invention.

FIG. 5 shows an isometric view of a supportive draping strip 170 of a preferred embodiment of the present invention.

The supportive draping strips 170 may be formed by joining two sides 140 of the removable, drapable liner 100 using a suitable join method such as, but not limited to, a double stitched seam 460. The join is preferably made so that the supportive draping strips 170 protrudes outward from the removable, drapable liner 100, i.e. outward from the space enclosed by the joined base 130 and the sides 140. Having the supportive draping strips 170 protrude out may have a number of advantages such as, but not limited to, simplifying the manufacture of the removable, drapable liner 100, making the removable, drapable liner 100 easier to use, and allowing maximum use of the inside space of the removable, drapable liner 100.

The supportive draping strips 170 may typically have a width in a range of 0.25 to 3 inches, though they are more preferably in a range of 0.5 to 2 inches, and most preferably in a range of 0.75 to 1.5 inches.

The Society for Plastics Industry, based in Washington, D.C., has classified plastics according to the following code:
Type 1—PETE Polyethylene Terephthalate (PET)
  Soda & water containers, some waterproof packaging.
Type 2—HDPE High-Density Polyethylene
  Milk, detergent & oil bottles. Toys and plastic bags.
Type 3—V Vinyl/Polyvinyl Chloride (PVC)
  Food wrap, vegetable oil bottles, blister packages.
Type 4—LDPE Low-Density Polyethylene
  Many plastic bags. Shrink wrap, garment bags.
Type 5—PP Polypropylene
  Refrigerated containers, some bags, most bottle tops, some carpets, some food wrap.
Type 6—PS Polystyrene
  Throwaway utensils, meat packing, protective packing.
Type 7—OTHER Usually layered or mixed plastic.
  No recycling potential—must be landfilled.

Of these, types 1 and 2 are commonly recycled, while type 4 is less commonly recycled. The other types are generally not recycled, except perhaps in small test programs. Common plastics polycarbonate (PC) and acrylonitrile-butadiene-styrene (ABS) do not have recycling numbers.

Although plastic recycling is in its infancy, and the process may be messy and inefficient, advances are, and will continue to be made. Making the removable, drapable liner 100 of recyclable materials, including recyclable plastics may therefore be highly desirable. In a alternate preferred embodiment, the removable, drapable liner 100 may be made from fabrics that are recyclable materials such as, but not limited to, woven or nonwoven fabrics having plastics fibers that are classified as type 1, 2 or 4 type plastics by the SPI.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A removable, drapable liner for a cargo space of a vehicle, comprising:
   a first, second and third piece of flexible, tear resistant, water resistant fabric, having a second piece length equal to a third piece length, a second piece width equal to a third piece width, and a first piece length equal to the sum of said second piece length, said second piece width and said third piece width;
   a left side join connecting said length of said second piece to a first portion of said length of said first piece;
   a right side join connecting said length of said third piece to a second portion of said length of said first piece, on an opposite side of said first piece to said left side join;
   a double stitched, overlapping join between said width of said second piece and a third portion of a length of said first piece forming a first front support strip;
   a double stitched, overlapping join between said width of said third piece and a forth portion of a length of said first piece forming a second front support strip;
   a double stitched, overlapping join between a width of said second piece to a portion of a length of said first piece forming a first back support strip;
   a double stitched join between a width of said third piece and a portion of a length of said first piece forming a second back support strip; and
   said joined pieces of fabric forming a base and four sides of said removable, drapable liner that is transformable between a stored state and a box shape such that when said removable, drapable liner is in said box shape, said four supportive draping strips protrude outwards, and away from, said removable, drapable liner.

2. The liner of claim 1 wherein said draping strip has a width in a range of 0.5 to 2 inches.

3. The liner of claim 1 wherein said flexible, water resistant fabric is comprised of a plastic designated as being a type 1, 2 or 4 plastic by the Society for Plastics Industry.

* * * * *